United States Patent
Harumoto et al.

(10) Patent No.: US 9,335,492 B2
(45) Date of Patent: May 10, 2016

(54) LENS COMPONENT

(71) Applicant: SUMITOMO ELECTRIC INDUSTRIES, LTD., Osaka-shi, Osaka (JP)

(72) Inventors: Michiko Harumoto, Yokohama (JP); Takayuki Shimazu, Yokohama (JP); Masaki Oyagi, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 86 days.

(21) Appl. No.: 14/272,876

(22) Filed: May 8, 2014

(65) Prior Publication Data

US 2014/0334785 A1  Nov. 13, 2014

(30) Foreign Application Priority Data

May 10, 2013  (JP) ................................ 2013-099841

(51) Int. Cl.
*G02B 6/26* (2006.01)
*G02B 6/42* (2006.01)
*G02B 6/38* (2006.01)

(52) U.S. Cl.
CPC ............ *G02B 6/4204* (2013.01); *G02B 6/3897* (2013.01); *G02B 6/4278* (2013.01); *G02B 6/4292* (2013.01)

(58) Field of Classification Search
CPC .. G02B 6/4204; G02B 6/3897; G02B 6/4278; G02B 6/4292
USPC .......................................................... 385/53
See application file for complete search history.

(56) References Cited

U.S. PATENT DOCUMENTS

| 6,947,671 | B2 * | 9/2005 | Sekiya | ................... G02B 6/32 359/489.09 |
| 6,951,392 | B2 * | 10/2005 | Jones | ................... G02C 7/021 351/159.74 |
| 7,295,375 | B2 * | 11/2007 | Jacobowitz | ...... B29D 11/00365 359/619 |
| 7,350,915 | B2 * | 4/2008 | Jones | ................... G02C 7/021 351/159.69 |
| 7,399,421 | B2 * | 7/2008 | Jacobowitz | ...... B29D 11/00365 216/24 |
| 7,614,802 | B2 | 11/2009 | Morioka | |

(Continued)

FOREIGN PATENT DOCUMENTS

JP   2009-163212 A   7/2009

OTHER PUBLICATIONS

"Microinjection molding of microsystem components: new aspects in improving performance" by Yang et. al.; Journal of Micromechanics and Microengineering; Received Mar. 17, 2013, in final form May 17, 2013 Published Aug. 1, 2013.*

*Primary Examiner* — Ryan Lepisto
*Assistant Examiner* — Guy Anderson
(74) *Attorney, Agent, or Firm* — Drinker Biddle & Reath LLP

(57) ABSTRACT

A lens component of the present invention has an identification mark that can be formed without impairing the lens surface profile. The lens component includes: at least one set of lenses including, an element-side lens provided facing to a light emitting and receiving element; and a fiber-side lens provided facing to a transmitting and receiving optical fiber; an element-side lens forming surface formed on the element-side lens; and an identification mark provided on the element-side lens forming surface. The element-side lens and the identification mark are separated from each other by a distance that is at least the radius of the element-side lens.

10 Claims, 5 Drawing Sheets

(56) References Cited

U.S. PATENT DOCUMENTS

| | | | | |
|---|---|---|---|---|
| 7,733,758 B2* | 6/2010 | Ota | | G11B 7/13922 369/112.23 |
| 7,948,856 B2* | 5/2011 | Ota | | G11B 7/13922 369/112.23 |
| 8,000,358 B2* | 8/2011 | Wang | | H01S 5/4025 372/29.011 |
| 8,795,162 B2* | 8/2014 | Vayser | | A61B 1/00135 600/184 |
| 9,044,161 B2* | 6/2015 | Vayser | | A61B 1/00135 |
| 9,072,452 B2* | 7/2015 | Vayser | | A61B 1/00135 |
| 2004/0258354 A1* | 12/2004 | Sekiya | | G02B 6/32 385/35 |
| 2005/0007547 A1* | 1/2005 | Jones | | G02C 7/021 351/159.01 |
| 2005/0248724 A1* | 11/2005 | Jones | | G02C 7/021 351/159.69 |
| 2007/0029277 A1* | 2/2007 | Jacobowitz | | B29D 11/00365 216/24 |
| 2007/0030570 A1* | 2/2007 | Jacobowitz | | B29D 11/00365 359/626 |
| 2007/0297063 A1* | 12/2007 | Jacobowitz | | B29D 11/00365 359/619 |
| 2008/0218869 A1* | 9/2008 | Jacobowitz | | B29D 11/00365 359/619 |
| 2008/0285136 A1* | 11/2008 | Jacobowitz | | B29D 11/00365 359/619 |
| 2009/0154877 A1 | 6/2009 | Morioka | | |
| 2011/0052126 A1* | 3/2011 | Yamamoto | | G02B 6/4204 385/92 |
| 2011/0097432 A1* | 4/2011 | Yu | | B29C 33/304 425/116 |
| 2011/0229083 A1* | 9/2011 | Dainese Jnior | | G02B 6/3869 385/74 |
| 2011/0236521 A1* | 9/2011 | Wu | | G02B 6/3865 425/446 |
| 2011/0244068 A1* | 10/2011 | Lin | | B29C 45/14 425/123 |
| 2011/0262582 A1* | 10/2011 | Wu | | B29C 45/0046 425/542 |
| 2012/0114289 A1* | 5/2012 | DeMeritt | | G02B 6/4292 385/79 |
| 2012/0189252 A1* | 7/2012 | Bhagavatula | | G02B 6/32 385/79 |
| 2013/0089290 A1* | 4/2013 | Sloey | | G02B 6/3817 385/74 |
| 2013/0130369 A1* | 5/2013 | Wilson | | B01L 3/5085 435/289.1 |
| 2013/0136400 A1* | 5/2013 | Isenhour | | G02B 6/3886 385/79 |
| 2013/0242401 A1* | 9/2013 | Shibuya | | B29C 45/0025 359/627 |
| 2013/0251309 A1* | 9/2013 | DeMerritt | | G02B 6/3833 385/60 |
| 2014/0084314 A1* | 3/2014 | Jacobowitz | | B29D 11/00365 257/88 |
| 2014/0088371 A1* | 3/2014 | Vayser | | A61B 1/00135 600/249 |
| 2014/0112627 A1* | 4/2014 | Isenhour | | G02B 6/4204 385/88 |
| 2014/0178009 A1* | 6/2014 | Ko | | G02B 6/36 385/77 |
| 2014/0185988 A1* | 7/2014 | Qi | | G02B 6/428 385/77 |
| 2014/0303448 A1* | 10/2014 | Vayser | | A61B 1/00135 600/249 |
| 2014/0309492 A1* | 10/2014 | Vayser | | A61B 1/00135 600/104 |

* cited by examiner

LENS COMPONENT

CROSS-REFERENCE TO RELATED APPLICATION(S)

The present application claims the benefit of priority of Japanese Patent Application No. 2013-099841 filed on May 10, 2013. The disclosures of the application are incorporated herein by reference.

BACKGROUND

1. Technical Field
The present disclosure relates to lens components.
2. Related Art
An optical module is known that converts electrical signal into optical signal, or optical signal into electrical signal. Such an optical module includes an optical fiber, a photoelectric conversion element that emits and receives light, and an optical coupling element (lens component) that optically couples the photoelectric conversion element and the optical fiber (see, for example, JP-A-2009-163212).

The lenses in the lens component of related art such as the foregoing publication are designed for optimum shape according to the optically coupled light emitting and receiving element and optical fiber so that optical coupling of these elements can be efficiently achieved. This means that lens components of different lens surface profiles are produced for each different optically coupled light emitting and receiving element and optical fiber.

Such lens components typically have small lens diameters of 1 mm or less, and the lens surface profiles may differ merely by the slight difference in the curvature of the lens surface. This makes it difficult to distinguish between lens components when these products are mixed together. The present inventors looked into this problem, and thought of marking lens components to enable each individual lens components to be distinguished from one another. It was found, however, that marking a lens component involves the risk of causing a change in the flow of the resin during the injection molding of the lens component, and lowering the profile accuracy of the lens.

SUMMARY

Exemplary embodiments of the invention provide a lens component in which formation of the identification mark is restrained from impairing the lens surface profile.

A lens component according to an exemplary embodiment of the invention, comprises:
at least one set of lenses including,
an element-side lens provided facing to a light emitting and receiving element; and
a fiber-side lens provided facing to a transmitting and receiving optical fiber;
an element-side lens forming surface on which the element-side lens is formed; and
an identification mark provided on the element-side lens forming surface,
wherein the element-side lens and the identification mark are separated from each other by a distance that is at least the radius of the element-side lens.

According to a second aspect of the present invention, there is provided a lens component that includes:
at least one set of lenses including;
an element-side lens provided facing to a light emitting and receiving element; and
a fiber-side lens provided facing to a transmitting and receiving optical fiber;
an element-side lens forming surface on which the element-side lens is formed; and
an identification mark provided on the element-side lens forming surface,
wherein the identification mark is formed farther away than the element-side lens relative to a gate mark that results from injection molding.

DETAILED DESCRIPTION OF EXEMPLARY EMBODIMENT

Figure 1:
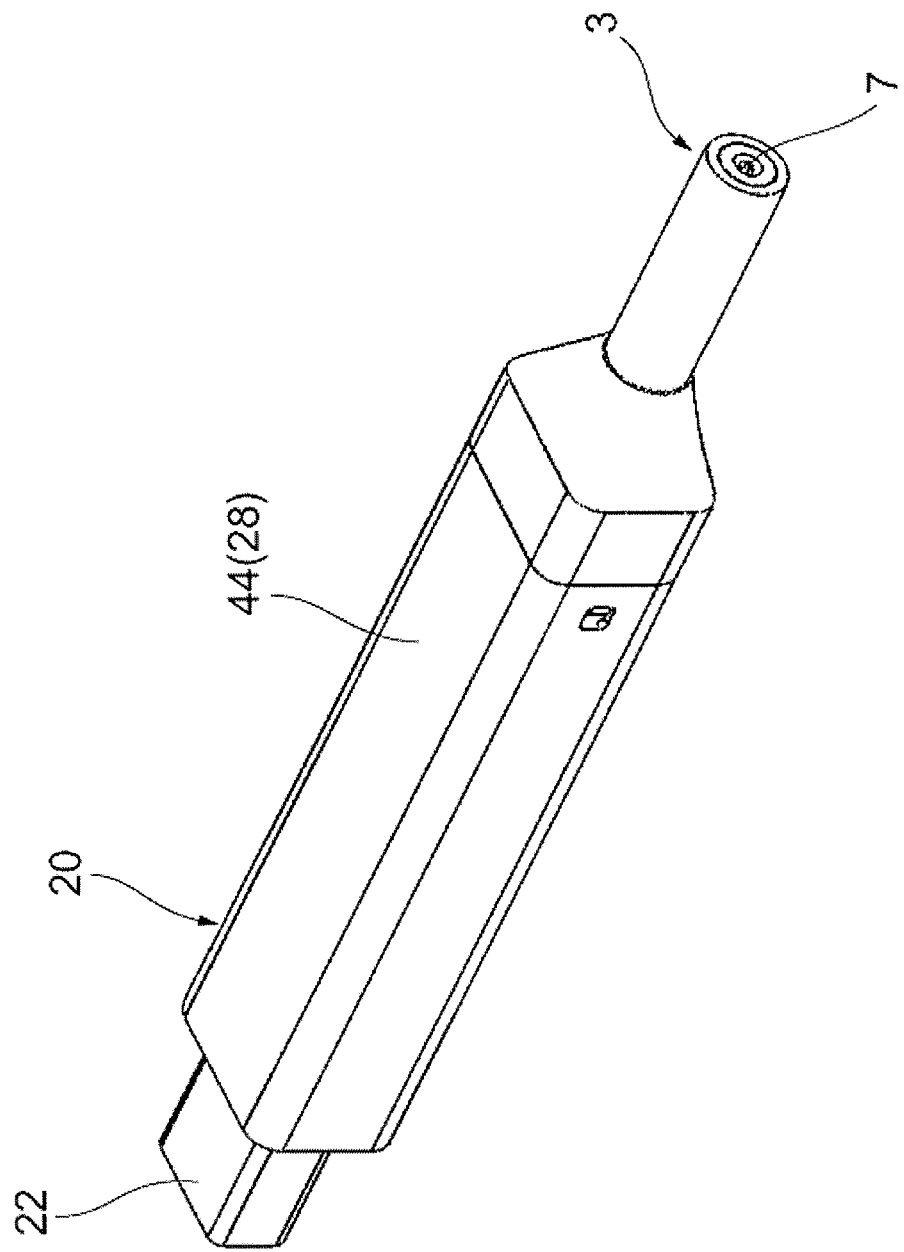
FIG. 1 is a perspective view representing an optical module according to an embodiment of the present invention.

Description of Embodiment of the Present Invention

The substance of an embodiment of the present invention is described first in a list form, as follows.
(1) A lens component comprising:
at least one set of lenses including,
an element-side lens provided facing to a light emitting and receiving element; and
a fiber-side lens provided facing to a transmitting and receiving optical fiber;
an element-side lens forming surface on which the element-side lens is formed; and
an identification mark provided on the element-side lens forming surface,
wherein the element-side lens and the identification mark are separated from each other by a distance that is at least the radius of the element-side lens.

Because the distance between the element-side lens and the identification mark is at least the radius of the element-side lens, any disturbed resin flow due to the formation of the identification mark is unlikely to affect the element-side lens in the injection molding of the lens component. In this way, formation of the identification mark can be restrained from impairing the lens surface profile of the lens component formed.

(2) It is preferable that the element-side lens and the identification mark be separated from each other by a distance that is at least the diameter of the element-side lens. With the distance between the element-side lens and the identification mark being at least the diameter of the element-side lens, any disturbed resin flow due to the provision of the identification mark is less likely to affect the molding of the element-side lens as afforded by the increased distance.

(3) It is preferable that the identification mark be raised relative to the element-side lens forming surface. In this way, the mark forming portion for forming the identification mark in injection molding can easily be formed by a simple process such as by cutting a mold.

(4) It is preferable that the identification mark be 1 mm or more as measured as the length of a shorter side of an imaginary rectangle enclosing the identification mark. In this way, the identification mark can easily be checked by visual inspection.

(5) It is preferable that the identification mark be an alphabet letter, or (6) a numeric character. In this way, a variety of different types of lens components can be easily distinguished from one another.

(7) The lens component may have a suction surface to which a mounting device attaches for transport of the lens component, and the suction surface may be a surface different from the element-side lens forming surface on which the identification mark is formed. In this way, the mounting device can reliably attach to the lens component when the mounting device used to transport the lens component has a small suction force.

(8) The lens component may have a suction surface to which a mounting device attaches for transport of the lens component, and the suction surface may be the element-side lens forming surface that includes the identification mark. In this way, the mounting device can reliably release the lens component when the mounting device used to transport the lens component has a large suction force.

(9) It is preferable that the identification mark be formed farther away than the element-side lens relative to a gate mark that results from injection molding. In this way, the identification mark forms on the downstream side of the element-side lens in injection molding, and any disturbed resin flow due to the provision of the identification mark is unlikely to affect the element-side lens.

(10) A lens component comprising:
at least one set of lenses including,
an element-side lens provided facing to a light emitting and receiving element; and
a fiber-side lens provided facing to a transmitting and receiving optical fiber;
an element-side lens forming surface on which the element-side lens is formed; and
an identification mark provided on the element-side lens forming surface,
wherein the identification mark is formed farther away than the element-side lens relative to a gate mark that results from injection molding.

In this way, the identification mark forms on the downstream side of the element-side lens in injection molding, and any disturbed resin flow due to the provision of the identification mark is unlikely to affect the element-side lens. Formation of the identification mark can thus be restrained from impairing the lens surface profile of the lens component formed.

(11) It is preferable that the element-side lens and the identification mark be separated from each other by a distance that is at least the radius of the element-side lens. In this way, any disturbed resin flow due to the formation of the element-side lens is less likely to affect the identification mark during the injection molding of the lens component. This makes it possible to form a clear identification mark.

Optical Module

A specific example of the lens component according to an exemplary embodiment of the invention is described below with reference to the accompanying drawings. It should be noted that the present invention is in no way limited by the following exemplary embodiment, and is intended to include all modifications and alterations that may fall within the scope of the attached claims, insofar as they come within the scope of the claims or the equivalent meaning thereof.

Figure 2:
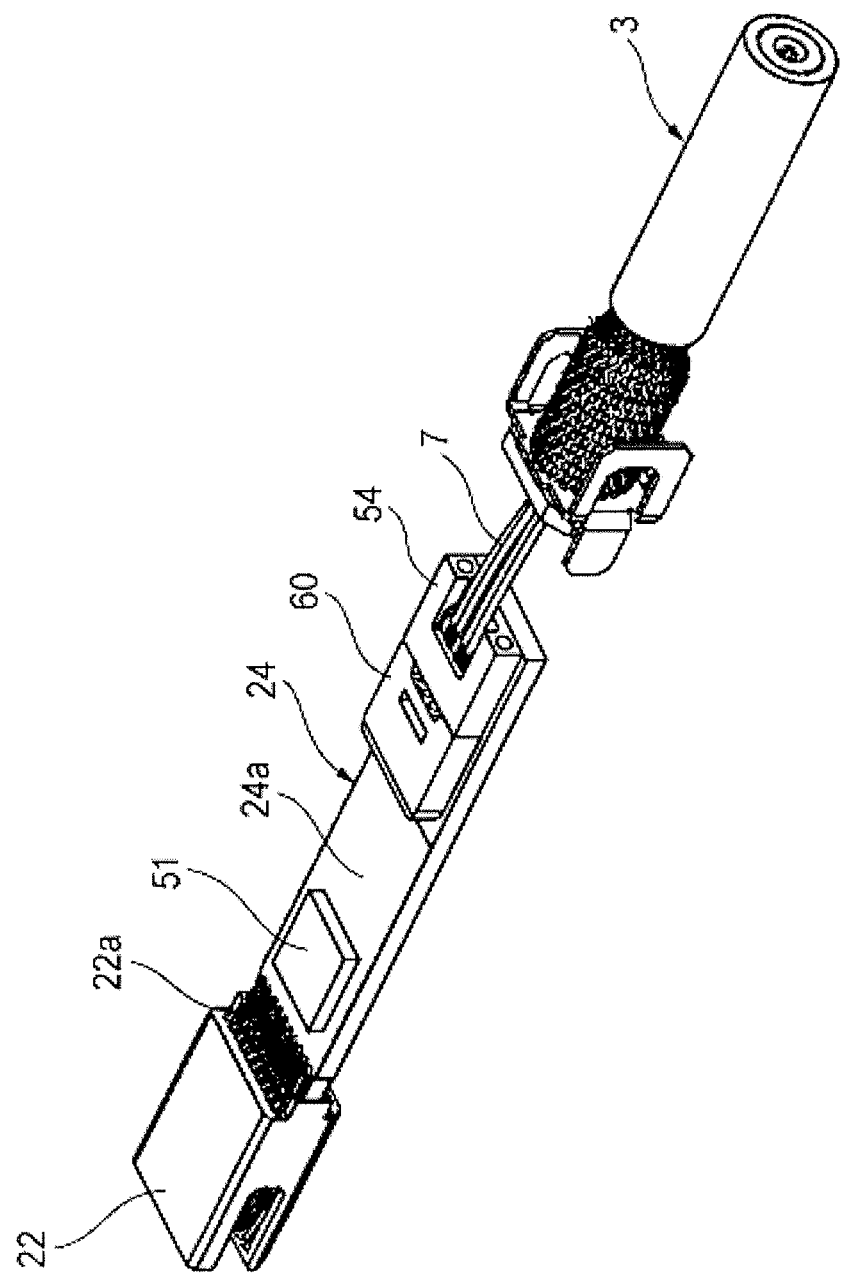
FIG. 2 is a perspective view of the optical module in a state without a housing.
Figure 3A:
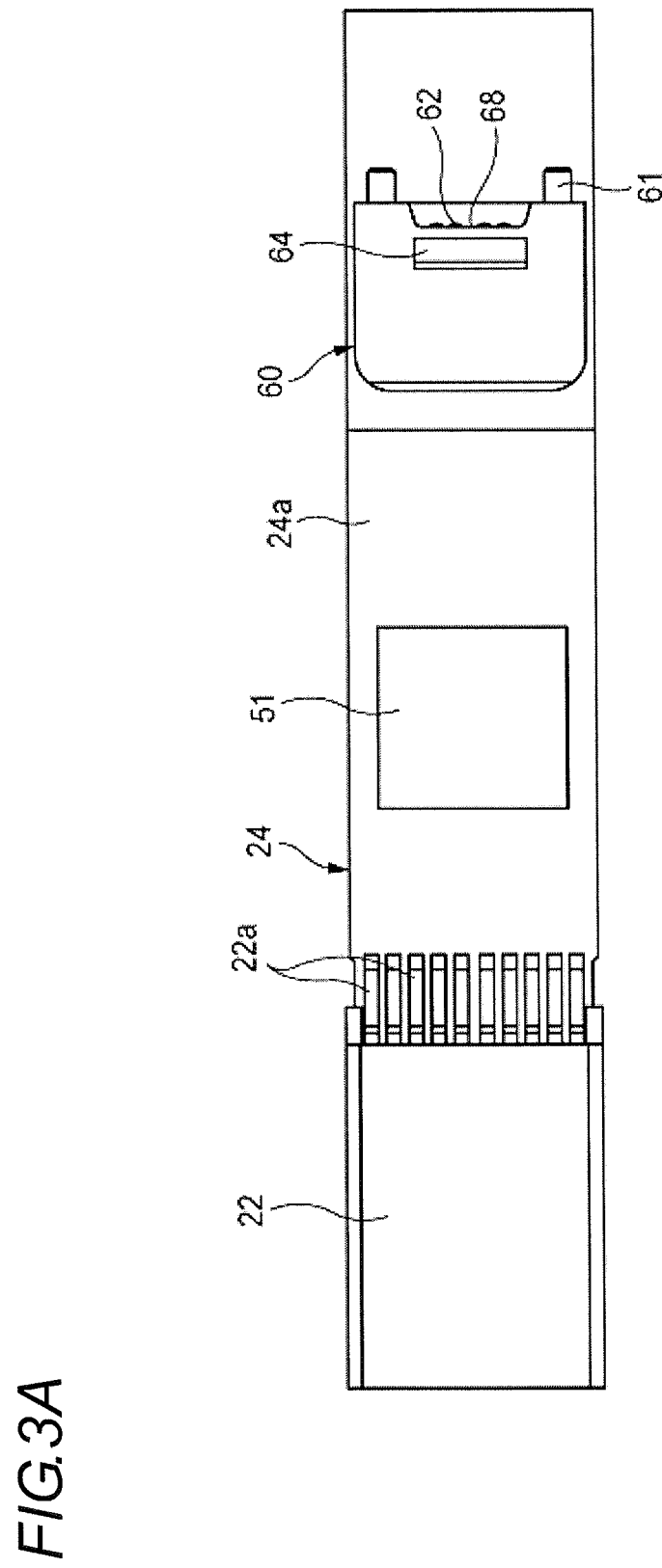
FIG. 3A is a diagram showing a circuit board as viewed from above.
Figure 3B:
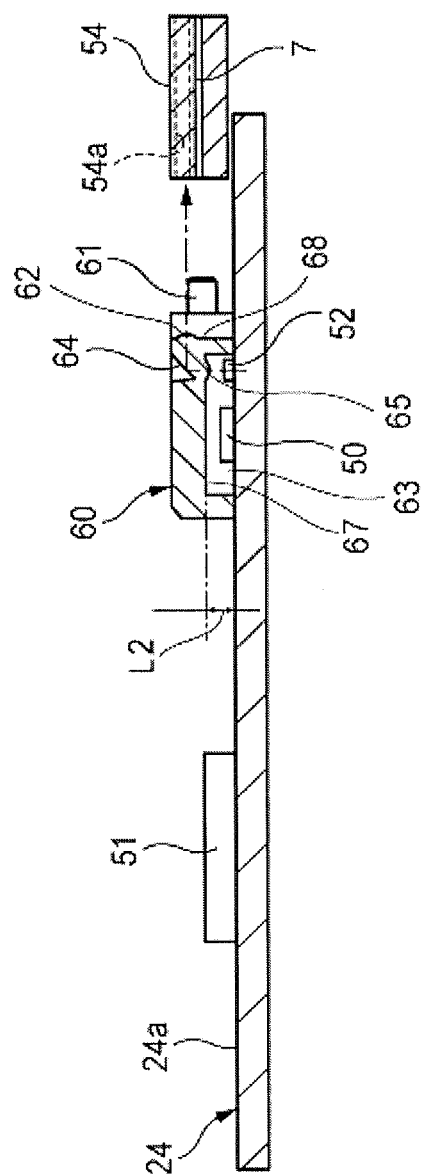
FIG. 3B is a sectional side view of the circuit board.

An optical module with a lens component according to the exemplary embodiment is described below with reference to FIG. 1 to FIG. 3B. FIG. 1 is a perspective view illustrating the optical module according to the exemplary embodiment. FIG. 2 is a perspective view of the optical module, representing a state without a housing. FIG. 3A is a diagram showing a circuit board as viewed from above. FIG. 3B is a sectional side view of the circuit board.

The optical module is used for transmission of signals (data) in applications such as optical communications. The optical module is electrically connected to electrical devices such as personal computers, and sends the input and output electrical signals in the form of optical signals after converting the electrical signals into optical signals.

As illustrated in FIG. 1, an optical module 1 includes a housing 20, an electrical connector 22 provided on the front end side of the housing 20, and an optical cable 3 attached to the rear end side of the housing 20.

The optical cable 3 has a plurality of optical fibers (sending and receiving optical fibers; 4 fibers in this example) 7. The optical fibers 7 may be realized by, for example, optical fibers that use fused quartz for the core and the clad (AGF: All Glass Fiber), or plastic optical fibers that use hard plastic for the clad (HPCF: Hard Plastic Clad Fiber).

As illustrated in FIG. 2, a circuit board 24, and a lens component 60 provided on the circuit board 24 are housed inside the housing 20.

The electrical connector 22 is inserted into the target (for example, a Personal Computer) to provide an electrical interconnection with the target. The electrical connector 22 is disposed on the front end side of the housing 20, projecting forward out of the housing 20. The electrical connector 22 is electrically connected to the circuit board 24 via a terminal 22a.

A connector component 54 is attached to one end of the optical fibers 7. The optical cable 3 is connected to the lens component 60 via the connector component 54.

FIG. 3A is a top view of the circuit board 24. FIG. 3B is a sectional side view of the circuit board 24. The electrical connector 22 and the connector component 54 are shown only in FIG. 3B, and are omitted in FIG. 3A.

As illustrated in FIG. 3A, the circuit board 24 is substantially rectangular in shape in planar view, and has a predetermined thickness. The circuit board 24 is an insulating substrate, for example, such as a glass epoxy substrate, and a ceramic substrate, and has circuit wiring of gold (Au), aluminum (Al), copper (Cu), or other materials formed on the surface or inside.

A first semiconductor 50 (see FIG. 3B), a second semiconductor 51, and light emitting and receiving elements 52 are mounted on a mount surface 24a of the circuit board 24. The circuit board 24 electrically connects the first semiconductor 50, the second semiconductor 51, and the light emitting and receiving elements 52 to the electrical connector 22. The first semiconductor 50 is, for example, a driving IC (integrated circuit) that drives the light emitting and receiving elements 52. The second semiconductor 51 is, for example, a CDR (clock data recovery) device provided as a waveform shaper.

The light emitting and receiving elements 52 are mounted on the mount surface 24a of the circuit board 24. The light emitting and receiving elements 52 are light emitting elements, for example, such as light emitting diodes (LED), laser diodes (LD), and a vertical cavity surface emitting laser (VCSEL). The light emitting and receiving elements 52 also may be light receiving elements, for example, such as photodiodes (PD).

As illustrated in FIG. 3B, the lens component 60 is provided on the mount surface 24a of the circuit board 24, covering the light emitting and receiving elements 52 and the first semiconductor 50. The light emitting and receiving elements 52, and the optical fibers 7 of the optical cable 3 are optically connected to each other via the lens component 60.

As illustrated in FIG. 3B, guide pins 61 are provided for the lens component 60. The connector component 54 has guide holes 54a for insertion of the guide pins 61. The optical fibers 7 and the lens component 60 are optically coupled to each other upon fitting the guide pins 61 of the lens component 60 to the guide holes 54a of the connector component 54.

The optical module 1 configured as above receives electrical signals through the electrical connector 22. The incoming electrical signals are input to the light emitting elements 52 via the second semiconductor 51 and the first semiconductor 50. The light emitting elements 52 convert the input electrical signals into optical signals. The optical signals are output to the sending optical fibers 7 via the lens component 60.

The optical module 1 also receives optical signals through the receiving optical fibers 7. The incoming optical signals are input to the light receiving elements 52 via the lens component 60. The light receiving elements 52 convert the input optical signals into electrical signals. The electrical signals are output to the electrical connector 22 via the first semiconductor 50 and the second semiconductor 51.

Lens Component 60

Figure 4:
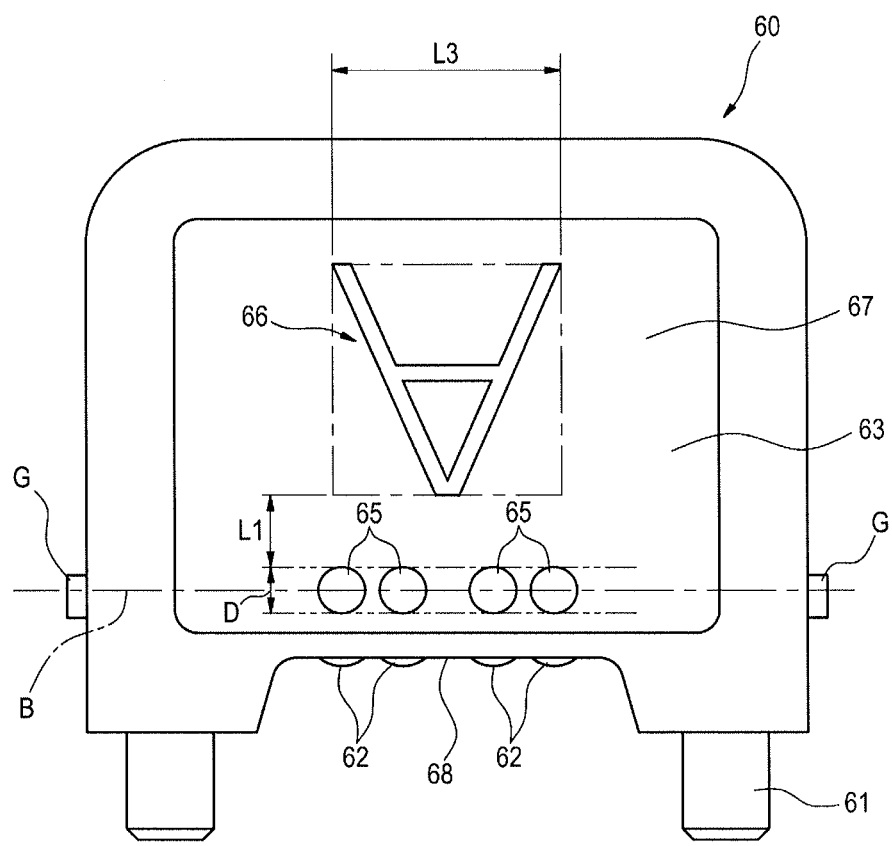
FIG. 4 is a bottom view of a lens component according to the embodiment of the present invention.

The lens component 60 is described below in detail using FIGS. 3A and 3B, and FIG. 4. FIG. 4 is a bottom view of the lens component 60 of the exemplary embodiment as viewed from the circuit board 24 side.

The lens component 60 is a component formed by molding of a transparent resin. As illustrated in FIGS. 3A and 3B, the lens component 60 is a flat, substantially rectangular component, mounted on the circuit board 24 with one of the wider surfaces facing the mount surface 24a. The lens component 60 includes element-side lenses 65 and fiber-side lenses 62, the former being provided facing to the light emitting and receiving elements 52, and the latter being provided facing to the end surface of the optical fibers 7. The lens component 60 of the exemplary embodiment has four sets of element-side lenses 65 and fiber-side lenses 62.

The lens component 60 has a recessed portion 63 in a central portion of the surface facing the mount surface 24a of the circuit board 24, away from the circuit board 24. The light emitting and receiving elements 52, and the first semiconductor 50 are housed in the space between the recessed portion 63 and the circuit board 24. The bottom surface of the recessed portion 63 represents an element-side lens forming surface 67 where the element-side lenses 65 are formed. The element-side lenses 65 are formed so as to project out of the element-side lens forming surface 67.

The surface of the lens component 60 facing the optical fibers 7 represents an optical fiber-side lens forming surface 68 where the fiber-side lenses 62 are formed. The fiber-side lenses 62 are formed in such a manner that the lens surfaces project out of the fiber-side lens forming surface 68.

A reflecting surface 64 that optically connects the element-side lens 65 and the fiber-side lens 62 is formed on the opposite side of the element-side lens forming surface 67. The reflecting surface 64 is formed at 45 degree angle with respect to the direction normal to the light emitting and receiving surface of the light emitting and receiving elements 52, and 45 degree angle with respect to the optical axis direction of the optical fibers 7.

Identification Mark

As illustrated in FIG. 4, in the lens component 60 of the exemplary embodiment, the identification mark 66 is formed at a position distant away from the element-side lenses 65 in the element-side lens forming surface 67 at the bottom surface of the recessed portion 63. The identification mark 66 is formed on the opposite side of the fiber-side lenses 62 relative to the element-side lenses 65 on the element-side lens forming surface 67. The identification mark 66 is raised outward relative to the element-side lens forming surface 67.

The distance L1 between the identification mark 66 and the element-side lenses 65 is at least the radius D/2 of the element-side lenses 65. The identification mark 66 is formed farther away than the element-side lenses 65 relative to gate marks G that are left behind by the resin injection gates after the injection molding of the lens component 60. In the exemplary embodiment, the gate marks G are formed on the side surfaces of the lens component 60 different from the element-side lens forming surface 67 and the fiber-side lens forming surface 68, and lie in the vicinity of the extended line along the array direction B of the element-side lenses 65. The gate marks G are not limited to this position, as long as the identification mark 66 is formed further away from the gate marks G than the element-side lenses 65.

It is preferable that the identification mark 66 be 1 mm or more as measured as the length of a shorter side L3 of an imaginary rectangle enclosing the identification mark. In this way, the identification mark can easily be checked by visual inspection.

The lens component 60 is fabricated in a variety of forms as may be decided according to the types of the optical fibers 7 and the light emitting and receiving elements 52 to be optically connected. The lens surfaces of the fiber-side lenses 62 and the element-side lenses 65 of each type of lens component 60 are designed for optimum shape to achieve the highest optical coupling efficiency. For example, the lens surface profile of each type of lens component 60 differs by size and curvature, which vary according to parameters such as the thickness and the type of the optically coupled optical fiber, the mode number of optical signals, and the size and the type of the light emitting and receiving element. In addition to lens surface profile, the lens component 60 may differ by the depth L2 of the recessed portion 63 according to the thickness of the light emitting and receiving elements 52, in order to provide a sufficient distance from the mount surface 24a of the circuit board 24 to the element-side lens forming surface 67.

An exemplary embodiment of a method of manufacturing different types of lens component 60 at low cost is as follows. First, a common mold is prepared that forms commonly shaped parts of the lens component 60, specifically all parts except for the fiber-side lenses 62 and the element-side lenses 65. Different shapes of the fiber-side lenses 62 and the element-side lenses 65 are formed with separate lens insert molds of different shapes prepared for each different type of lens component 60. The lens component 60 is injection molded by combining these common mold and designated lens insert molds.

The lens insert mold used to form the element-side lenses 65 is a mold that forms the element-side lens forming surface 67, including the element-side lenses 65. The lens insert mold may be a single integrated mold having designated mold portions that form the element-side lens forming surface 67 and the fiber-side lens forming surface 68, or may be two separate molds that independently mold these surfaces.

The lens component 60 produced by using such a method is molded with a common mold, and has the same shape except for the lens surface profile. This makes it difficult to distinguish between such different lens components 60 when these are mixed together. The difficulty particularly arises from the fact that the lens surface typically measures as small as 1 mm, despite that the fiber-side lenses 62 and the element-side lenses 65 have different lens surface profiles. The curvature difference is also small, as may be the case for the depth of the recessed portion 63.

As a countermeasure, the present inventors appended the lens component 60 with an identification mark 60, unique to each type of lens component 60, to help identify each different lens component 60. In the lens component 60 of the exemplary embodiment, the identification mark 66 is formed on the element-lens forming surface 67 in a position separated from the element-side lenses 65 by a distance of at least the radius D/2 of the element-side lenses 65.

The identification mark 66 is formed in the injection molding of the lens component 60 upon transferring a mark forming portion of the lens insert mold that forms the element-side lenses 65 and the element-side lens forming surface 67. This eliminates the need to provide the designated step of appending the identification mark 66, and the lens component 60 can produced at low cost. Further, because the lens insert mold has a mark forming portion, the lens insert mold may be combined with a common mold to achieve low-cost production of the lens component 60.

The identification mark 66 is formed as an outwardly raised portion relative to the element-side lens forming surface 67, and as such the mark forming portion of the lens insert mold is recessed. The recessed mark forming portion can be formed by cutting the surface of the lens insert mold. Formation of the mark forming portion is thus easy, merely requiring simple machining of the lens insert mold, and the lens insert mold can be fabricated in a short machining time.

When forming the identification mark 66 by injection molding as above, the presence of the mark forming portion may disturb the flow of the resin in the mold, and may cause inaccuracy in the shape of the element-side lenses 65 formed. The element-side lenses 65 require high profile accuracy, and the tolerance needs to be within about 1 to 2 μM of the designed profile.

For this reason, the distance L1 separating the identification mark 66 and the element-side lenses 65 from each other is set to at least the radius D/2 of the element-side lenses 65 in the lens component 60 according to the exemplary embodiment. With such a large distance L1, any disturbed resin flow in the mold due to the provision of the mark forming portion is prevented from affecting the element-side lenses 65.

Further, gates are positioned in such a manner that the portion that forms the element-side lenses 65 is on the upstream side of the mark forming portion. This helps prevent the element-side lenses 65 on the upstream side from being affected by any disturbed resin flow due to the mark forming portion. The identification mark 66 thus forms in a position farther away from the gate marks G than the element-side lenses 65.

It is also preferable in this case to make the distance between the identification mark 66 and the element-side lenses 65 at least the radius D/2 of the element-side lenses 65. This helps prevent the identification mark 66 from being affected by any disturbed resin flow in the forming portion of the element-side lenses 65, and makes it possible to clearly form the identification mark 66.

Mark Shape

The identification mark 66 formed in the lens component 60 is different for each different type of lens component 60. Thus, the difference in the shape of the identification mark 66 may cause the resin to behave differently in each lens component 60.

For example, in the case when the identification mark 66 has a relative simple shape of straight lines such as a square, the identification mark 66 usually does not cause any adverse effect on the formation of the element-side lenses 65 in the nearby region. On the other hand, the identification mark 66 has the possibility of seriously affecting the formation of the element-side lenses 65 when it has a complex shape composed of straight lines and curves such as the Arabic numeral 2. Increasing the size of the identification mark 66 also tends to cause serious effects on the formation of the element-side lenses 65.

The lens component 60 according to the exemplary embodiment deals with this problem by making the distance L1 between the element-side lenses 65 and the identification mark 66 at least the radius D/2 of the element side lenses 65. In this way, any disturbed resin flow due to a complex shape of the identification mark 66 can be damped and confined in a certain range before the resin reaches the forming portion of the element-side lenses 65. Because changes in the behavior of the resin in forming the element-side lenses 65 can be confined within a certain range even when the identification mark 66 has a relatively complex shape, the element-side lenses 65 can be formed with uniform profile accuracy.

Further, because gates are positioned to bring the forming portion of the element-side lenses 65 upstream of the mark forming portion in the exemplary embodiment, any disturbed resin flow due to the differences in the shape of the identification mark 66 is unlikely to affect the formation of the element-side lenses 65.

The lens component 60 according to the exemplary embodiment can thus use a variety of simple and complex shapes as the identification mark 66, including, for example, alphabet letters and Arabic numerals. This makes it possible to easily distinguish between a wider variety of lens component 60. Further, these different shapes of identification mark 66 may have different sizes, because the element-side lenses 65 can be formed with certain levels of profile accuracy even when the size of the identification mark 66 is different.

Preferably, the distance L1 between the element-side lenses 65 and the identification mark 66 is at least the diameter D of the element-side lenses 65, provided that the element-side lens forming surface 67 has a sufficiently large area. With such a large distance L1, the provision of the identification mark 66 can be restrained from lowering the profile accuracy of the element-side lenses 65.

In the assembly of the optical module, amounting device picks up the lens component 60 with a suction member that attaches to the lens component 60 by creating a vacuum. The lens component 60 is either transported, or mounted on the circuit board 24. Here, the suction member preferably makes contact over a large area to cause the vacuum to act on large area. The suction member thus attaches to the element-side lens forming surface 67 or the opposite surface of the element-side lens forming surface 67, because these surfaces have large areas in the flat, substantially rectangular shape of the lens component 60.

When the suction member used to transport the lens component 60 has a small suction force, the suction member preferably attaches to the opposite surface of the element-side lens forming surface 67, specifically the surface on which the identification mark 66 is not formed (the surface on the side of the reflecting surface 64). This is because the suction member attached to the surface on the side of the identification mark 66 cannot provide a strong suction force because of the gap created by the irregularities of the identification mark 66 between the suction member and the lens component 60.

On the other hand, when the suction member used to transport the lens component 60 has a large suction force, there are cases where the suction member does not easily release the lens component 60 upon release. In this case, the suction member preferably attaches to the element-side lens forming surface 67 that includes the identification mark 66. This creates an air flow through the gap created by the irregularities of the identification mark 66 between the suction member and the lens component 60, and weakens the suction force for easy release of the lens component 60.

It should be understood that the embodiment of the disclosure, either in part or as a whole, is intended to be illustrative, and not restrictive. The scope of the present invention is not confined within the foregoing meaning, and is intended to include all modifications and alterations that may fall within the scope of the attached claims, insofar as they come within the scope of the claims or the equivalent meaning thereof.

The exemplary embodiment has been described through the lens component 60 in which the distance L1 separating the element-side lenses 65 and the identification mark 66 from each other is at least the radius D/2 of the element-side lenses 65, and that has the identification mark 66 in a position farther away than the element-side lenses 65 relative to the gate marks G that result from the injection molding. However, the exemplary embodiment is not limited to this.

For example, the identification mark 66 may be closer than the element-side lenses 65 to the gate marks G that result from the injection molding, provided that the distance L1 between the element-side lenses 65 and the identification mark 65 is at least the radius D/2 of the element-side lenses 65. In this way, any disturbed resin flow due to the formation of the identification mark 66 in the injection molding can be restrained from affecting the element-side lenses 65. The lens component 60 can thus be produced without the lens surface profile being impaired by the formation of the identification mark 66.

The distance L1 separating the element-side lenses 65 and the identification mark 65 from each other may be less than the radius D/2 of the element-side lenses 65, provided that the identification mark 66 is farther than the element-side lenses 65 relative to the gate marks G that result from the injection molding. In this case, the element-side lenses 65 form on the upstream side of the identification mark 66 in the injection molding, without being affected by the disturbed resin flow due to the provision of the identification mark 66.

The exemplary embodiment described the case where only one identification mark 66 is formed. However, more than one identification mark 66 may be formed on the lens component 60.

The identification mark 66, described in the exemplary embodiment as being a mark for identifying lens components 60 having different lens surface profiles, may also be used to individually identify the same type of lens component 60 (e.g., the same lot number).

The identification mark 66 was described as an alphabet letter or an Arabic numeral. However, the exemplary embodiment is not limited to this. For example, the identification mark 66 may be characters or pictorial figures, other than alphabet letters or Arabic numerals. It is, however, preferable not to use not easily distinguishable shapes that are inverted images of each other, for example, such as a square, a circle, the Arabic numerals 6 and 9, and the alphabet letters M and W.

This application claims priority to Japanese patent application filed May 10, 2013 (Application Number 2013-099841), the entire contents of which are hereby incorporated by reference. All the references cited herein are incorporated by reference in their entirety.

What is claimed is:
1. A lens component comprising:
at least one set of lenses including,
an element-side lens provided facing to a light emitting and receiving element; and
a fiber-side lens provided facing to a transmitting and receiving optical fiber;
an element-side lens forming surface on which the element-side lens is formed; and
an identification mark provided on the element-side lens forming surface,
wherein the element-side lens and the identification mark are separated from each other by a distance that is at least the radius of the element-side lens, and
wherein the identification mark is 1 mm or more as measured as the length of a shorter side of an imaginary rectangle enclosing the identification mark.

2. The lens component according to claim 1, wherein the element-side lens and the identification mark are separated from each other by a distance that is at least the diameter of the element-side lens.

3. The lens component according to claim 1, wherein the identification mark is raised relative to the element-side lens forming surface.

4. The lens component according to claim 1, wherein the identification mark is an alphabet letter.

5. The lens component according to claim 1, wherein the identification mark is a numeric character.

6. The lens component according to claim 1, wherein the lens component has a suction surface to which a mounting device attaches for transport of the lens component, and
wherein the suction surface is a surface different from the element-side lens forming surface.

7. The lens component according to claim 1, wherein the lens component has a suction surface to which a mounting device attaches for transport of the lens component, and
wherein the suction surface is the element-side lens forming surface.

8. The lens component according to claim 1, wherein a gate mark is placed such that the element-side lens is closer to the gate mark than any portions of the identification mark.

9. A lens component comprising:
at least one set of lenses including,
an element-side lens provided facing to a light emitting and receiving element; and
a fiber-side lens provided facing to a transmitting and receiving optical fiber; and
an element-side lens forming surface on which the element-side lens is formed;
an identification mark provided on the element-side lens forming surface,
wherein a gate mark is placed such that the element-side lens is closer to the gate mark than any portions of the identification mark, and
wherein the identification mark is 1 mm or more as measured as the length of a shorter side of an imaginary rectangle enclosing the identification mark.

10. The lens component according to claim 9, wherein the element-side lens and the identification mark are separated from each other by a distance that is at least the radius of the element-side lens.

* * * * *